United States Patent Office 2,988,424
Patented June 13, 1961

2,988,424
PROCESS FOR CONTROLLING THE DENSITY OF A LAMINAR FORM OF ALUMINA
Robert J. Walsh, Dayton, Ohio, assignor to Monsanto Chemical Company, St. Louis, Mo., a corporation of Delaware
No Drawing. Filed Mar. 15, 1957, Ser. No. 646,204
3 Claims. (Cl. 23—143)

This invention relates to the production of alumina in a form having controlled physical properties. It is an object of the invention to provide alumina in a laminar form, the physical properties of which may be controlled over a wide range.

It has been found that the preparation of a laminar form of alumina having a desired bulk density and other specific physical properties may be carried out by oxidation of atomized solutions containing specific proportions of mixtures of aluminum sulfate and aluminum chloride. Vapor phase oxidation of aqueous or organic solvent solutions of the said sulfates and chlorides is carried out by burning a combustible gas with air or oxygen under conditions so as to obtain a flame temperature maintained between 800° C. and 1,800° C., within an oxidation zone, the particles resulting from said atomization being exposed to said temperature for a period of time from 0.5 second to 0.001 second.

If it is desired to include the oxides of other metals in combination with the alumina, soluble compounds of such metals may be added to the solution of aluminum salts which is to be atomized. As an example, silica may be added to the alumina product by adding the compound ammonium silicofluoride to the solution which is to be atomized.

The laminar particles of alumina, either crystalline or amorphous, as produced in accordance with the present invention, have been found to possess physical properties quite different from the properties of discrete spherical particles as well as irregular aggregates or gel forms of the oxides. Thus, it has been found that aqueous suspensions of the present laminar form of aluminum oxide can be filtered with unusual ease such as in the washing operation to remove soluble salts. The laminar form enables filtration to be accomplished very readily with resultant ease of purification. In contradistinction, the conventional forms of alumina as obtained from aqueous solution have generally been slow filtering because of the gelatinous and compressible nature of the filter cakes. These gelatinous cakes also dry to a hard shell-like product which must be ground in order to be further processed. It has been found that such grinding is unnecessary with the present product.

The laminar particles obtained in the practice of the present invention are in general leaf- or flake-shaped particles having dimensions in the range of from 1 to 30 microns average particle diameter and an average particle thickness of 0.005 to 0.1 micron. The internal crystal structure of this alumina is predominantly of the delta type, particularly when employing a flame temperature of 800 to 1,200° C. At higher temperatures, such as flame temperatures of 1,200 to 1,800° C., increasing proportions of alpha alumina are found in the laminar alumina product.

The present invention is concerned with the control of the physical properties of the laminar form of alumina prepared by oxidizing a finely atomized solution of aluminum chloride and aluminum sulfate. For example, it has been found that the bulk density of the alumina may be increased from the normal value obtained when oxidizing pure aluminum sulfate up to a value of 18 pounds per cubic foot by varying the proportion of aluminum chloride and aluminum sulfate in the solution which is oxidized. In general, the proportion of aluminum chloride with respect to aluminum sulfate in order to achieve these objects is in range of from 0.039 to 0.35 weight ratio of aluminum chloride to aluminum sulfate, anhydrous basis. This proportion may also be expressed with respect to the laminar alumina which is produced, i.e., from 4.76% to 31% of the alumina has been derived from aluminum chloride, and the balance from aluminum sulfate. In the practice of the invention the various commercial forms of aluminum chloride and aluminum sulfate including the various hydrated forms may be employed in preparing the starting solutions. The concentration of the aluminum salts in the said solution may range from 1% by weight (anhydrous basis) to as high as the saturation limit. The solvent is preferably water, although other inorganic or organic solvents may also be used to advantage. Typical organic solvents for the present process are alcohols or ketones as representative of inert combustible organic liquids. The organic solvents employed for the present purpose must have less than 5 carbon atoms in the molecule, for example, methanol, ethanol, n-propanol, isopropanol, butanol, isobutanol, tert.-butanol, methyl ethyl ketone, acetone or dioxane.

In the embodiment of the present invention using the aluminum sulfate dissolved in an organic solvent, the employment of the solvent makes it possible to achieve an extremely rapid atomization as the liquid stream passes from the nozzle into the oxidation zone. In the use of an organic solvent, it is also found that the presence of the large amount of organic solvent gases, and gaseous combustion products aids in controlling the rapidity of oxidation.

In carrying out the oxidation process of the present invention, the solution of the metal sulfate is first atomized by admixture with an atomizing gas which may be inert (for example nitrogen), or may contain oxygen either as a pure stream of oxygen or as air. The atomizing gas may also be combustible, for example, hydrogen or natural gas may be used. The atomizing gas stream is supplied in sufficient quantity to atomize the liquid feed. The gases employed in the present process may be purified in order to avoid contamination of the oxide product. The combustion gases such as hydrogen, natural gas and carbon monoxide should be free of difficultly combustible constituents such as tarry hydrocarbons so as to avoid the formation of organic occlusion and non-homogeneous, incompletely oxidized products. Secondary gas streams such as an auxiliary air stream may also be employed in order to achieve complete combustion, and to prevent the deposition of oxides on the walls of the oxidation zone. The present oxidation process is carried out at a high temperature so that it is desirable to provide a refractory vessel which may be vertically or horizontally disposed. The particles of product suspended in the gas stream leaving the oxidation zone are cooled by direct or indirect heat exchange and are then collected by suitable means such as a water spray or wetted wall tower, a cyclone separator, electrostatic precipitator, bag filters, etc.

When combustion occurs, the fuel gas and the solvent vapors (if combustible) are burned with an oxidizing flame to provide uniform heating and at the same time effect oxidation of the metal salts to the corresponding laminar oxide without permitting undesired crystal growth at this stage. The atomizing carrier gas may be employed in the minimum amount required to atomize the solution or may be used in excess, for example, in the amount required for combustion in order to heat the mixture to reaction temperature. The laminar form of oxide is obtained when operating with a flame temperature of from 800° C. to 1,800° C., a preferred range being from 1,000° C. to 1,400° C. for a period of time of 0.5 second to 0.001 second, a preferred range being from 0.1 to 0.01 second. In order to provide for sufficient heat in the oxidation step, secondary air or gas may also be provided. The combustion of the hydrogen, carbon monoxide, natural gas, or other combustible gas with air or oxygen thus provides the major source of heat necessary for the oxidation. In those instances in which an organic liquid solvent is employed, additional heat is supplied by the combustion of such organic liquid. The combustible components are supplied in amount sufficient to maintain the particles in the reaction zone at the desired temperature as set forth above.

It is important in some cases in the production of laminar crystalline aluminum oxide that the particles leaving the oxidation zone be cooled rapidly in order to "freeze" the particles in the desired preferred crystalline form. The cooling period is maintained from 0.01 second to one second, a preferred cooling time being from 0.05 second to 0.5 second for the particles to reach the collection temperature of from 50° C. to 350° C., preferably 50° C. to 200° C. By this means the particles leaving the oxidation zone are prevented from undergoing further transformation. The product stream leaving the combustion zone may be cooled by passage through coolers or by quenching, as for example, by the addition of cool air or other vapors and liquids, such as water. One method of operation is to collect the product in a spray tower using a water spray to cool and collect the oxides.

The following examples illustrate specific embodiments of the invention:

Example 1

A laminar form of alumina was prepared by charging an aqueous solution containing 21.3 pounds of aluminum sulfate, technical grade, having the approximate formula $Al_2(SO_4)_3 \cdot 14.5H_2O$ and 1.19 pounds of aluminum chloride technical grade having the approximate formula $AlCl_3 \cdot 6H_2O$ together with 31.6 pounds of water. This solution corresponds to an $AlCl_3Al_2(SO_4)_3$ weight ratio of 0.10 based upon the anhydrous components. The above solution was fed to a burner nozzle at the rate of 5.23 pounds per hour and was atomized into a gas flame. The gas flame was fed with natural gas at the rate of 7.09 pounds per hour and 2.03 pounds per hour of oxygen together with a peripheral stream of air flowing at the rate of 164.2 pounds per hour to produce a stable flame. The product obtained was a laminar form of alumina having a bulk density of 5.0 pounds per cubic foot.

A water spray system was used to cool the oxide particles rapidly and to collect the product. It was found that the water slurry of alumina thus obtained could be filtered very readily. It is a characteristic of the present laminar form of alumina, since the prior art gel and spheroidal forms of alumina are slow filtering and colloidal in nature.

Example 2

In order to demonstrate the control of the bulk density of alumina in accordance with the present invention, an oxidation run was carried out similarly to that of Example 1 but charging a solution containing 8.66 pounds of technical grade aluminum sulfate and 2.32 pounds of technical grade aluminum chloride together with 14.3 pounds of water. This mixture had a weight ratio of $AlCl_3/Al_2(SO_4)_3$ of 0.26. The product obtained had a bulk density of 13 pounds per cubic foot.

Example 3

In order to demonstrate the range of bulk density of the alumina obtained by present oxidation procedures, two experiments were conducted similarly to that of Example 1, but charging only the single compounds: (1) aluminum sulfate, and (2) aluminum chloride, respectively. It was found that the bulk density of the products were as follows:

| | Pounds per cubic foot |
|---|---|
| Alumina from aluminum sulfate | 1.6 |
| Alumina from aluminum chloride | 40 |

It was found that the laminar alumina as prepared from aluminum sulfate and aluminum chloride from solution could be ground with linseed oil to give a paste which was then readily incorporated into a paint base to give an effective paint. Instead of linseed oil as a vehicle, other organic drying oils have been found to be of utility, such as oiticia, soya and tung oils and also vehicles such as turpentine and mineral spirits. The present form of alumina can also be suspended in water as a vehicle if a suitable suspending agent such as carboxymethylcellulose is employed.

The following formulation represents the application of the above laminar alumina to obtain a white enamel. Parts are given by weight.

| | Parts |
|---|---|
| Alumina of Ex. 1 | 70 |
| Zinc oxide | 290 |
| Manganese silicate | 400 |
| Linseed oil, alkali refined | 430 |
| Linseed oil, heat bodied | 45 |
| Thinner | 90 |
| Lead naphthenate | 11 |
| Cobalt naphthenate | 1.5 |

The laminar oxides of the present invention are of unusual utility in coating compositions. The laminar particles, when employed as a pigment constituent in coating compositions, provide a leafing action which results in the establishment of a vapor barrier that protects the coated surface. This effect is achieved with the laminar oxides of the present invention when employed as reinforcing pigments in the formulation of paints, lacquers and other coating compositions. The coating compositions essentially comprise the above laminar alumina in a vehicle of water or an organic liquid such as linseed oil, soy bean oil, turpentine or benzol. To this may be added a pigment, driers and extenders.

The laminar oxides of the present invention have the further advantage of possessing a high controllable value of oil absorption as measured by the Gardner-Coleman method. In this method, 5 g. of the sample are mixed on a glass plate with successive additions of linseed oil which are worked in with a spatula until an end point is reached where the material has become putty-like. The amount of linseed oil thus taken up is calculated as percent oil absorption for the pigment. In the following table the above laminar alumina of Example 2 is compared with other finely-divided substances:

| Sample | Percent Oil Absorption |
|---|---|
| Laminar $Al_2O_3$ of Ex. 3, from pure $Al_2(SO_4)_3$ | 676 |
| Alumina from Ex. 2 | 206 |
| Alumina from aluminum chloride | 100 |
| Commercial $Al_2O_3$ particles, finest grade | 126 |
| $TiO_2$ (Commercial rutile pigment) | 46 |

It is seen from the above data that the present form of alumina derived from varying proportions of aluminum chloride and aluminum sulfate permit the obtainment of medium ranges of oil absorption values. In this way a wide variety of oil absorption characteristics may be produced for specific industrial purposes.

Example 4

A thermal insulating panel was prepared by filling the spaces between two walls with the laminar alumina of Example 1. It was found that the panel provided excellent insulation with very little flow of heat from one panel to the other. The present oxides may readily be employed in insulating various pieces of equipment, such as refrigerators. An advantage of the present oxides in this application is the ease with which the finely-divided laminar oxides may be blown or flowed into the walls of such equipment and easily adapted to the filling of containers and wall spaces.

One aspect of the present invention contemplates a thermal insulating process and appliances such as refrigerators, in which the space between the walls thereof is filled with the presently-disclosed laminar form of alumina. The present laminar form of alumina is of particular advantage as a thermal insulator because of its insensitivity to water, i.e., if the product becomes wet in the insulation spaces, by condensation of water, it does not shrink upon wetting or upon redrying. In comparison, many commercial insulating materials, when utilized as powders, have the disadvantage that water will wet the powders and cause the insulation to shrink upon redrying, thus resulting in the complete loss of the insulating value of the powder.

The heat conductivity value and the apparent density of the laminar alumina of Example 1 was determined and compared to the corresponding figures for a number of other insulating materials.

| | B.t.u. in. (Hr. ft.², ° F.) | Apparent Density (Lb./cu. ft.) |
|---|---|---|
| Magnesia (powder) | 0.42 | 49.7 |
| Mica | 3.0 | ------------ |
| Asbestos | 1.16 | 36 |
| Burnt infusorial earth | 0.55 | 12.5 |
| Loose infusorial earth | 0.47 | 22 |
| Laminar alumina of Ex. 1 | 0.378 | 2.3 |

The laminar alumina of the present invention may also be formed into bricks and other forms. For example, a mixture of 1 part of the alumina, when mixed with two parts of brick mortar and slurried in water, gave a casting mixture which could be formed into lightweight insulating bricks and intricate case shapes.

*Example 5*

An insecticidal composition was prepared by mixing 90 grams of DDT (2,2-bis(parachlorophenyl)-1,1,1-trichloroethane) powder with 10 grams of the alumina of Example 1. This product flows readily and is characterized by resistance to caking or setting up because of the anti-caking action of the present laminar form of alumina. The alumina improves the insecticidal composition, since it provides a low density material, thus giving good bulking characteristics. One form of the present laminar alumina has a bulk density of about 2 pounds per cubic foot, whereas DDT powder has a bulk density of about 45 pounds per cubic foot. It is, therefore, possible to prepare mixtures of these two components to obtain any desired intermediate bulk density.

In general the range of proportions contemplated in preparation of biological toxicant mixtures utilizing the above laminar oxides is from 10% to 90% by weight of the oxides, and from 10% to 90% by weight of the biological toxicants. It has also been found that other toxicants, such as 2,4-dichlorophenoxy acetic acid and rotenone are advantageously formulated with the present laminar oxides to yield easy flowing biological toxicant dusts which have excellent bulking characteristics. In addition, the present laminar oxides adhere more tenaciously to foliage than do conventional fillers, such as commercial alumina.

*Example 6*

A red lake was prepared by slurrying 10 grams of the laminar alumina of Example 1 in 500 grams of water. Two tenths grams of a red dye, Chrom-Red Cloth (C.I. 262),was then added while stirring to obtain a brilliant red lake which maintained its color despite prolonged washing. This lake was dried and was then ground with linseed oil to obtain a red pigment for paint.

*Example 7*

A grease was prepared by mixing 100 grams of heavy lubricating oil with 10 grams of the laminar alumina of Example 2. The product was found to have thickened considerably to a good grease consistency.

In general greases may be prepared utilizing from 50% to 98% by weight of a lubricating oil such as a hydrocarbon oil and 50% to 2% by weight of the above laminar alumina.

The present laminar oxides are also of great utility as flow-improving agents. For example, table salt or Portland cement may be prevented from sticking and made to flow more readily by the addition thereto of minor proportions of alumina such as from 0.01 to 5% by weight.

What is claimed is:

1. A process for controlling the density of a laminar form of alumina within the range of bulk densities of from 2 to 16 pounds per cubic foot which comprises oxidizing an atomized solution of aluminum sulfate and aluminum chloride dissolved in a solvent, in which solution the relative weight ratio of aluminum chloride to aluminum sulfate varies from 0.039 to 0.34 with higher proportions of the said chloride yielding higher bulk density alumina and lower proportions of the said aluminum chloride yielding lower densities, the said oxidation being conducted by means of an oxidizing flame at a flame temperature of 800° C. to 1,600° C., for a period of time of from 0.5 second to 0.001 second.

2. A process for controlling the density of a laminar form of alumina within the range of bulk densities of from 2 to 16 pounds per cubic foot which comprises oxidizing an atomized solution of aluminum sulfate and aluminum chloride dissolved in an organic solvent, in which solution the relative weight ratio of aluminum chloride to aluminum sulfate varies from 0.039 to 0.34 with higher proportions of the said chloride yielding higher bulk density alumina and lower proportions of the said aluminum chloride yielding lower densities, the said oxidation being conducted by means of an oxidizing flame at a flame temperature of 800° C. to 1,600° C., for a period of time of from 0.5 second to 0.001 second.

3. A process for controlling the density of a laminar form of alumina within the range of bulk densities of from 2 to 16 pounds per cubic foot which comprises oxidizing an atomized solution of aluminum sulfate and aluminum chloride dissolved in water, in which solution the relative weight ratio of aluminum chloride to aluminum sulfate varies from 0.039 to 0.34 with higher proportions of the said chloride yielding the higher bulk density alumina and lower proportions of the said aluminum chloride yielding lower densities, the said oxidation being conducted by means of an oxidizing flame at a flame temperature of 800° C. to 1,600° C., for a period of time of from 0.5 second to 0.001 second.

References Cited in the file of this patent

UNITED STATES PATENTS

| | | |
|---|---|---|
| 133,430 | Gamgee | Nov. 26, 1872 |
| 252,555 | Warren | Jan. 17, 1882 |
| 1,652,119 | Halvorsen et al. | Dec. 6, 1927 |
| 1,816,388 | Mittasch | July 28, 1931 |
| 2,053,208 | Curtis | Sept. 1, 1936 |
| 2,155,119 | Ebner | Apr. 18, 1939 |
| 2,246,452 | McGrew | June 17, 1941 |
| 2,333,948 | Muskat | Nov. 9, 1943 |
| 2,500,609 | Howard | Mar. 14, 1950 |
| 2,501,540 | Ryan | Mar. 21, 1950 |
| 2,573,650 | Peterson | Oct. 30, 1951 |
| 2,583,605 | Sirianni | Jan. 29, 1952 |
| 2,653,078 | Lane | Sept. 22, 1953 |
| 2,656,250 | Thibon | Oct. 20, 1953 |
| 2,828,186 | Dingman et al. | Mar. 25, 1958 |

FOREIGN PATENTS

| | | |
|---|---|---|
| 258,313 | Great Britain | Sept. 15, 1926 |